United States Patent [19]

Melton et al.

[11] 4,297,779
[45] Nov. 3, 1981

[54] METHOD OF JOINING STRUCTURAL ELEMENTS

[75] Inventors: Keith Melton, Busslingen; Olivier Mercier, Ennetbaden; Peter Taiana, Neuenhof, all of Switzerland

[73] Assignee: BBC Brown, Boveri & Company, Limited, Baden, Switzerland

[21] Appl. No.: 65,568

[22] Filed: Aug. 10, 1979

[30] Foreign Application Priority Data

Aug. 10, 1978 [CH] Switzerland ............... 8507/78
Aug. 10, 1978 [CH] Switzerland ............... 8509/78

[51] Int. Cl.³ .................................................. B23P 11/02
[52] U.S. Cl. ...................................... 29/446; 285/381; 403/273
[58] Field of Search ............... 29/447, 446, DIG. 35; 285/381; 403/273

[56] References Cited

U.S. PATENT DOCUMENTS 2,647,847  8/1953  Black et al. ................. 29/447
2,800,706  7/1957  Lindblom .................... 29/447 X
3,579,805  5/1971  Kast ........................... 29/447
3,740,839  6/1973  Otte ........................... 29/447 UX
3,805,567  4/1974  Agius-Sinerco ............. 285/381 X
3,872,573  3/1975  Nichols et al. .............. 29/447
3,910,448  10/1975 Evans et al. ................ 285/381 X
4,001,928  1/1977  Schweiso .................... 29/447

Primary Examiner—Charlie T. Moon
Attorney, Agent, or Firm—Oblon, Fisher, Spivak, McClelland & Maier

[57] ABSTRACT

A process for the manufacture of a solid gas and vacuum tight join between components of different physical properties using a joining element comprising a memory alloy whose memory effect gives rise to the necessary contraction or dilatation stress, in particular for the connection of a hollow body of ceramic material to a metallic object. Joins comprising a memory alloy joining element result from such process having a groove and steps and at least one further metallic or non-metallic component, in particular a hollow body.

16 Claims, 7 Drawing Figures

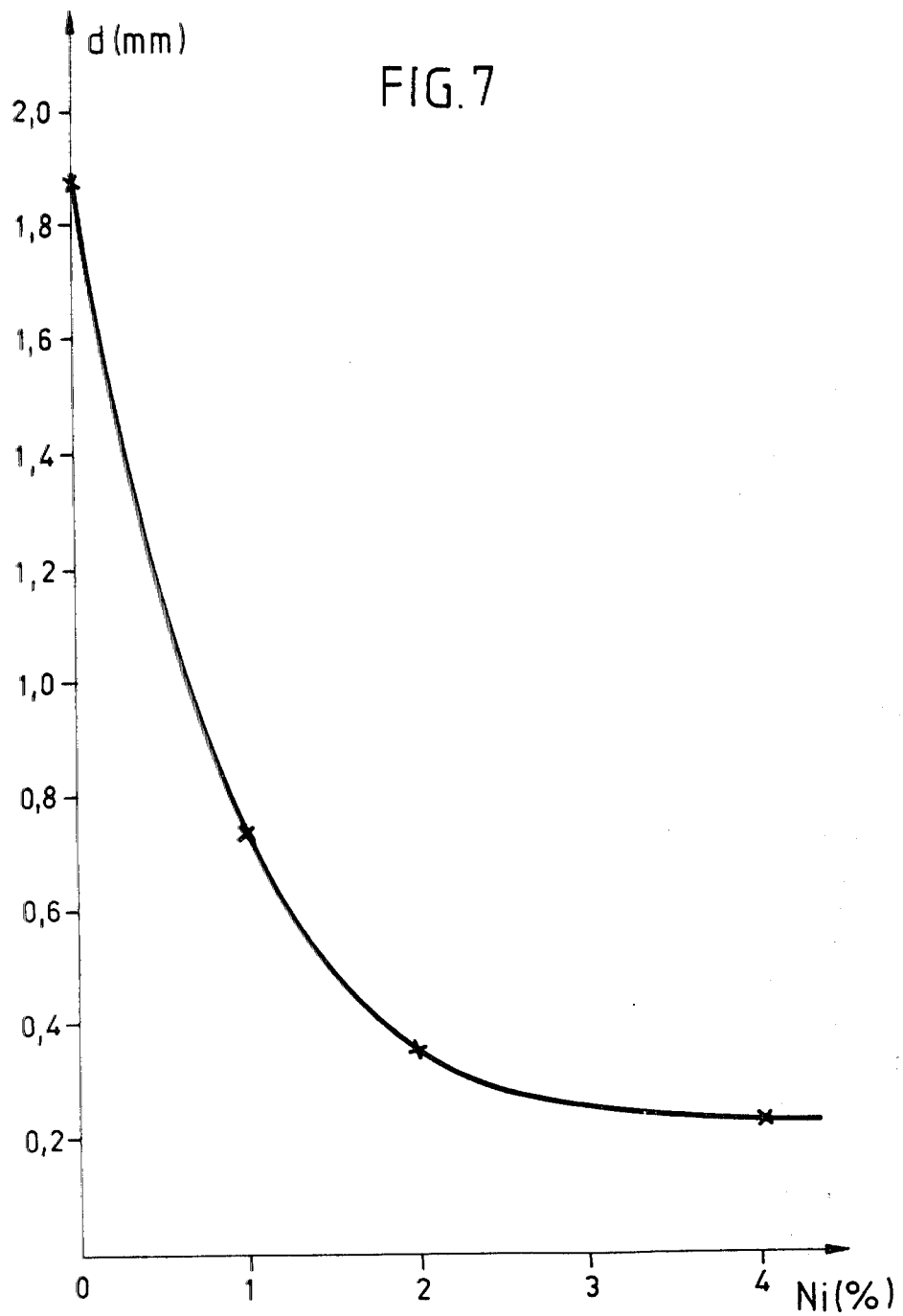

METHOD OF JOINING STRUCTURAL ELEMENTS

BACKGROUND OF THE INVENTION

1. Field of the Invention

The invention is concerned with a process for the construction of a rigid and tight joint between components using joining elements, a join made by this process and the application of a sleeve as joining element.

2. Description of the Prior Art

Numerous methods for the joining of components are known from physics and technology. Where metallic bodies are concerned, in many cases they can be joined together to form more or less monolithic workpieces in a simple manner by soldering, welding or using thermal shrinkage. If however, non-metallic objects such as ceramics, plastic or cermet bodies are to be joined to metallic components, difficulties are usually encountered. Brazing using suitable alloys is known in particular as being one of the tricky techniques for joining ceramic and metal components (e.g. G. M. Slaughter, "Ceramics and Graphite," chapter 24, p. 237-242 in Brazing Manual, American Welding Society, New York 1963; D. A. Canonio, N. C. Cole and G. M. Slaughter, "Direct brazing of ceramics, graphite and refractory metals," Welding Journal, August 1977). The braze used must sufficiently wet the surfaces of the objects to be jointed in order to guarantee an intimate and tight join.

The quoted conventional methods for making metal-ceramic joints require relatively high temperatures for all of the materials used in the total construction. Since the thermal expansion coefficients of metals and ceramics are very different, considerable stresses can occur, particularly with complicated shapes, which can lead to cracks during fabrication or in service. Often recourse has to be made to expensive constructions such as assembling the joint in layers in order to keep the stresses within tolerable limits. The brazes normally used require temperatures of 1000° C. and over and the processes have to be carried out in a complicated apparatus under vacuum or a protective atmosphere. In the case of joins using shrink fits, the metallic components have to be heated to a temperature of several hundred degrees centigrade, in order to achieve the necessary strain for the join, in consideration of the small thermal expansion coefficients. This method is limited, however, on the one hand by the hot strength of the metal and on the other hand by the thermal fatigue strength of the ceramic, leading either to joins of inadequate strength and tightness or to cracks in the ceramics part. There is thus a definite need in the technical world for a solid, tight and easily made joint.

SUMMARY OF THE INVENTION

The object of the invention is to specify a process for the production of a solid, in particular gas-tight and vacuum tight, join between components, especially ceramic materials either together or to metallic bodies, which process can be simply carried out without complicated equipment and avoiding large temperature differences and high absolute temperatures. It is a further aim of the invention to propose suitable possible solutions for the construction of such joins between components which may have widely differing physical properties.

The essential idea behind the invention consists in using a metallic body of a shape memory alloy as a joining element between the two components to be joined or as one of the components itself, whose shape memory effect is called upon for the provision of the necessary contraction or dilatation stresses.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 7 is a diagram of the grain size variation of a Cu/Zn/Al/Ni alloy as a function of nickel content.

DETAILED DESCRIPTION OF THE PREFERRED EMBODIMENTS

Figure 1:
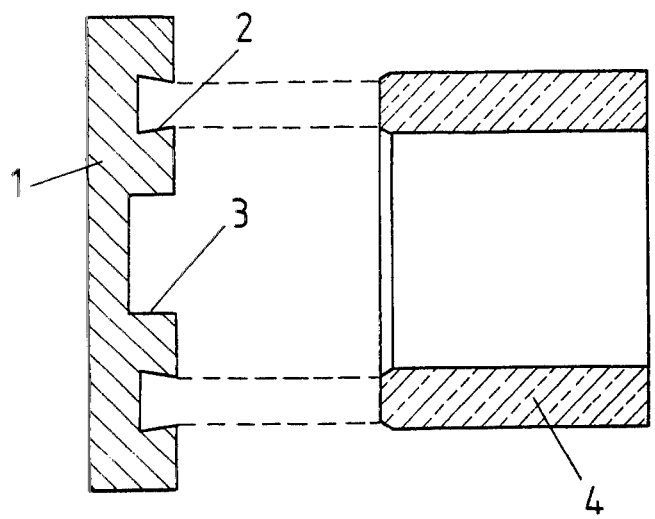
FIG. 1 is a sectional view through a disc-shaped joining element and a hollow component before assembly.
Figure 2:
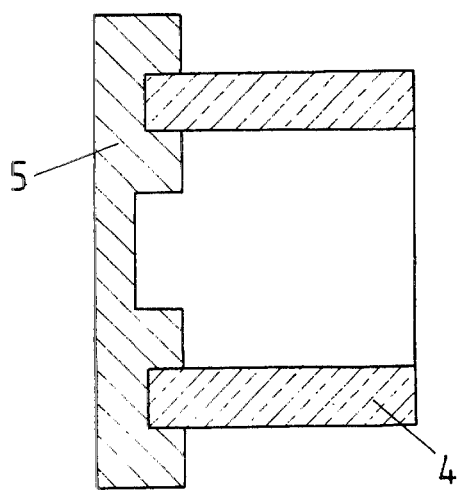
FIG. 2 is a sectional view through a disc-shaped joining element and a hollow component after assembly.

In FIGS. 1 and 2 are shown in each case a disc-shaped memory alloy joining element and a hollow component, before and after assembly. Both figures illustrate simultaneously the principle of the join and sequence of processes for its manufacture. Reference numeral 1 represents a joining element comprising a stepped disc of a memory alloy, with a dovetail groove 2 and a recess 3 on one face. Reference numeral 4 is a hollow body which can, for example, be a ceramic material, plastic or even a metal. In the present example it is a ceramic material whose wall thickness is oversized (i.e. 2-3%) with respect to the opening in the dovetail groove. After assembly and the corresponding heat treatment a vacuum-tight join is thereby guaranteed. Reference numeral 5 represents the memory alloy disc after assembly.

In the present example the following procedure was used. A memory alloy belonging to the $\beta$-brass type was melted in an inductively heated graphite crucible under an argon atmosphere and its composition was as follows:

Zinc: 20.5%
Aluminium: 6%
Nickel: 2%
Copper: balance

The thus prepared ingot was hot rolled at 850° C. to a plate approximately 5 mm thick. The plate was subsequently annealed for 10 min. at 950° C. in order to obtain the B-structure and then immediately quenched into water. The alloy of the above mentioned composition showed a temperature $M_s$ of the martensite transformation of +50° C. A disc 1 corresponding to FIG. 1 was turned from the plate and had the following dimensions:

Outer diameter: 53 mm
Edge thickness: 4.3 mm
Center thickness: 2.3 mm
Depth of the recess: 2 mm
Diameter of the recess: 34.4 mm
Depth of the groove: 2 mm
Radial width of groove:
  inner: 54 mm
  outer: 52 mm
Radial width of the outer edge: 2 mm The dovetail groove 2 thus has both on its outer and inner surfaces a conicity of 0.1 mm in 2 mm axial length. A dense, sintered aluminium oxide ring was prepared as the solid body 4 to be joined and was not subjected to any special surface treatment.

The cylindrical ring had on both its outer and inner circumference a 45° C. champfer 1 mm in axial length and had the following dimensions:

Outer diameter: 49.2 mm
Inner diameter: 38.4 mm
Radial wall thickness: 5.4 mm
Axial width: 12 mm The radial wall thickness of the ring thus corresponded exactly to the radial width of the groove at its base. The disc 1 and the ring 4 were axially pressed together at room temperature (20° C.) in a dry manner and without using a lubricant (see FIG. 2). Thereupon the thus produced workpiece was heated to 100° C., ie. well above the transformation temperature $M_s$ (+50° C.), where a solid joining of the components is guaranteed by the memory effect. The joint also proved to be mechanically sound and gas tight after cooling to room temperature.

It ought also to be pointed out that oversizing of the radial wall thickness of the hollow body 4 with respect to the radial width of the groove 1 at its narrowest point (for a dovetail groove the groove opening) can be up to approximately 3 to 4% when using a memory alloy on the basis of a special brass (Cu/Zn/Al). This amount corresponds to the maximum allowable strain for this alloy type at which the memory effect is guaranteed. It is self evident that by using other geometrical shapes for the groove this amount can also be chosen to be smaller. In the case of the present groove shape, FIG. 1, the radial width of the outer and inner rim faces of the disc 1 are preferably so chosen that the radial force on the outer and inner surfaces of the ring is approximately the same. Maximum oversize for Ti/Ni/Cu=8%.

The invention is not restricted to the alloy described in the present example or to the geometrical shape quoted. The process can be applied in principle to all memory alloys and also to profiles other than those with a circular cross section. In particular, solid or hollow bodies with rectangular, hexagonal, octagonal, elliptical or any other cross section can be joined to a metallic plate using the process described. The component to be joined does not thereby need to be of a ceramic material. It can also comprise metals, sintered metals, cermets, plastics etc.

Figure 3:
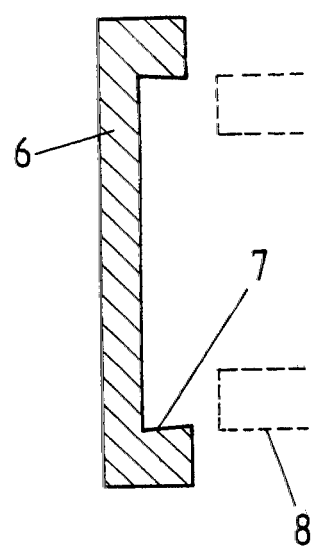
FIG. 3 is a sectional view through a disc-shaped joining element stepped on one side.

FIG. 3 shows a sectional view through a disc-shaped joining element, stepped on one side, made out of memory alloy. The disc 6 has a recess 7 on one of its end faces, whose inner diameter at its base corresponds exactly to the outer diameter of the hollow body 8 to be joined (indicated by dotted lines). The amount of oversizing of the hollow body 8 over the outer rim of the recess 7 can vary depending on the material (metal, ceramic, plastic). Assembly and finishing or sealing the join proceed analogously to the example described in FIGS. 1 and 2.

In an example corresponding to this Figure, the join was made as follows. A memory alloy of the following composition was melted, hot rolled, annealed and quenched using the process described above:

Zinc: 22%
Aluminium: 6%
Nickel: 2%
Copper: balance

The alloy of this composition had a martensitic transformation temperature $M_s$ of −50° C. A disc 6 with the following dimensions corresponding to FIG. 3 was machined from the conventionally manufactured rolled plate Outer diameter: 29.1 mm
Thickness at edge: 4.2 mm
Thickness at center: 2.2 mm
Depth of the recess: 2 mm
Diameter of the recess:
  inner: 26.1 mm
  outer: 25.1 mm
Radial width of the outer rim: 2 mm The conicity of the recess 7 was thus 0.5 mm in 2 mm axial length. In the present case the hollow body 8 to be joined is a cylindrical ring, similar to that in the first example (4 in FIG. 1), made out of porcelain. The porcelain ring did not have any special surface treatment. Its outer edges facing the joining element were given a 45° C. chamfer 1 mm in axial length. The dimensions were as follows:

Outer diameter: 25.4 mm
Inner diameter: 16.2 mm
Radial wall thickness: 4.6 mm
Axial length: 20.0 mm Using ethanol as coolant the disc 6 and the ring 8 were axially pressed together at a temperature of −70° C. and subsequently warmed to room temperature (20° C.). A solid, tight join was achieved by thus warming to well above $M_s$ (−50° C.). In order to measure the tightness, the porcelain tube was connected to a vacuum pump while the outside of the workpiece was brought into a helium atmosphere. No measurable helium leak could be detected in the above mentioned system at a vacuum of $10^{-4}$ Torr, which means that the helium leakage per unit time lay below the limit of detection ($10^{-9}$ mbar 1/s). The vacuum tightness of the metal/ceramic join was thereby proven.

The statements made in connection with the description of the first example with respect to the alloy composition and shape of the joining element are also valid for this example.

Figure 4:
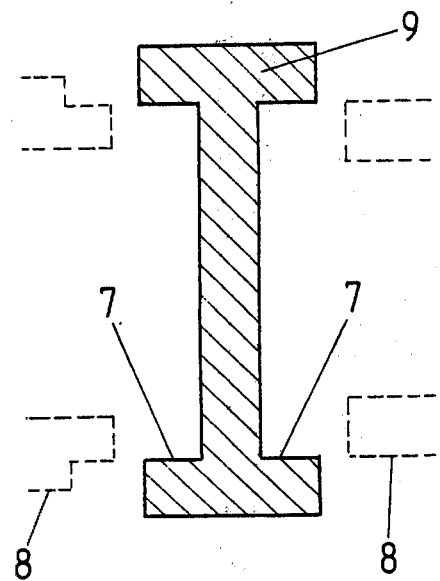
FIG. 4 is a sectional view through a disc-shaped joining element stepped on both sides.

A sectional view through a disc-shaped memory alloy joining element stepped on both sides is shown in FIG. 4. On both faces of the disc 9 is a recess 7 whose inner diameter corresponds to the outer diameter of the hollow body 8 to be joined. Depending on the material of the hollow body to be joined and on its dimensions, the recess 7 can be cylindrical or widen conically towards the inside (see FIG. 3). The hollow body 8 to be joined can be either cylindrically smooth (right side of the Figure) or stepped (left side of the Figure).

Figure 5:
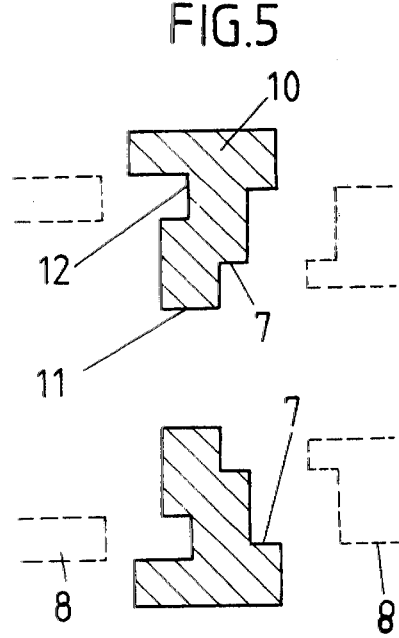
FIG. 5 is a sectional view through a joining element formed from a stepped hollow body with relief and a groove.

FIG. 5 shows a sectional view through a memory alloy joining element in the form of a hollow body. The hollow body 10 is stepped and has, for example, a recess 7 on one end face and a groove 12 on the other. It has also a central opening 11 which allows for example the accommodation of a further central component or makes possible the movement of a flowing medium (e.g. gas or liquid).

Figure 6:
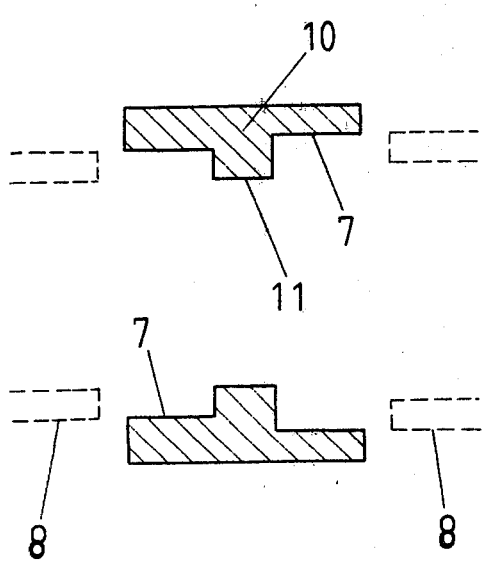
FIG. 6 is a sectional view through a joining element formed from a stepped tube.

FIG. 6 shows a sectional view through a joining element in the form of a stepped tube. The hollow body 10 made from a memory alloy has in its middle part as a central opening 11 a hole. This type of shaped part can be used advantageously as the connector of long objects such as tubes, rods etc. In order to guarantee adequate stability, the recesses 7 are constructed with a relatively large surface. It is self evident that the material of the tube or rod can have a rectangular, hexagonal, octagonal, oval or any other section as well as a round one.

The joining elements shown in FIGS. 1-6 can be made in principle from any memory alloy. They are advantageously constructed from alloys based on T/Ni or Ti/Ni/Cu or on the basis of Cu/Zn/Zl. Special $\beta$ brasses with nickel additions have proven particularly advantageous.

The effect of the addition of nickel can be seen from FIG. 7. The influence of nickel content from 0–4% on the grain diameter d (mm) is shown graphically for alloys containing 22% zinc, 6% aluminium, balance copper + nickel. All alloys were subjected to a solution anneal for 5 mins. at 950° C. and subsequent quenching in water. The solution annealing at high temperatures is necessary for all special brasses of the Cu/Zn/Al type in order to transform their structure into that of the primary $\beta$ phase, indispensable for the memory effect. As can be seen from the Figure conventional nickel free special brasses of this type show a marked tendency for grain growth on annealing. This manifests itself in a decrease in the mechanical properties, so that this type of joining element often shows cracks after quenching and as a consequence of the stresses arising from the memory effect. The cracks which form, mostly intercrystalline, can be effectively suppressed or at least held within tolerable limits by a corresponding alloying addition of nickel. Gas and vacuum tight joins can be achieved using the quoted alloys based on Cu/Zn/Zl/Ni. This is true for the combinations metal/metal, metal/plastic and above all for metal/ceramic and plastic/ceramic.

It also ought to be pointed out that the memory alloy joining element can also be made from relatively thin sheet instead of being machined from the solid. This is particularly so for the bodies in FIGS. 1 to 4, where, for example, the grooves and recessed parts can be made by conventional sheet forming methods such as stamping, pressing etc. By suitable shaping of the sheet at the clamping point before assembly, the memory effect can be utilized both in the direction of contraction and dilatation. Such joins between an elastic memory alloy sheet and a hollow body of ceramic material also proved themselves to be gas and vacuum tight.

Using the process according to the invention, a joining technique has been accomplished which allows the assembly in a simple manner to a solid whole of components, particularly those which differ widely in their physical properties such as metallic and ceramic bodies. Joins thus constructed distinguished themselves as being gas and vacuum tight. The process can be particularly advantageously used for the construction of physical and electronic equipment (e.g. electronic valves, gas discharge tubes etc.)

Memory alloy sleeves as coupling pieces for metallic tubes are known as such (e.g. DE-OS 20 65 651). Joins constructed in this way have demonstrated themselves to be very solid and generally gas-tight. It was, however, not obviously expected that such sleeves could also be used as joining elements for non-metallic elements in particular for the assembly of ceramic and metallic objects.

That this is possible will be described in more detail in the following example. The memory alloy of the Ti/Ni/Cu type had the following composition:

Titanium: 45%
Nickel: 43%
Copper: 10%
Iron: 2%

Such showed a martensite transformation temperature $M_2$ of $-80°$ C. The smooth, hollow cylindrical sleeve had the following dimensions in the starting condition:

Outer diameter: 10.04 mm
Inner diameter: 8.06 mm
Radial wall thickness: 0.99 mm
Axial length: 14.0 mm The sleeve was expanded at $-100°$ C. to a diameter of 8.25 mm by pulling through a mandrel. For the purpose of forming a join, on one side of the sleeve a porcelain rod and on the other side a stainless steel (18/8) tube each with an outer diameter of 8.2 mm were axially inserted. The whole was then warmed up to room temperature, whereby the sleeve contracted from the memory effect and a solid join was obtained between the tube and rod. To test the tightness, the join was brought into a helium atmosphere and the steel tube connected to a vacuum system. A helium leak rate of $10^{-7}$ mbar 1/s at $10^{-4}$ Torr and less than $10^{-9}$ mbar 1/s at 10 bar was thereby measured. This vacuum tightness was achieved without the use of intermediate layers of soft metal, o-rings or similar methods. The porcelain rod was also not subjected to any special surface treatment. The inner surface of the sleeve was completely smooth and had no kind of steps, recesses or teeth. The latter would only be disadvantageous.

One metal ceramic join was measured to be vacuum tight at at least $10^{-1}$ Torr. After 10 cycles between room temperature and 300° C. (holding time at 300° C. 10 mins.) the join was still sound and still vacuum tight at at least $10^{-1}$ Torr.

The use of memory alloy sleeves allows the manufacture of joins between solid bodies whose physical properties differ widely from each another. In particular metallic and ceramic components can be firmly connected together and gas- and vacuum-tight joins are produced.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the manufacture of a solid and tight join between components using first and second joining elements which comprises:

forming at least one annular dove-tail groove in said first joining element, said first joining element comprising a heat releasable, metallic, shape memory effect alloy;

pressing said second joining element into said at least one annular groove of said first joining element; and shrinking by heating said first joining element so as to form said solid and tight join due to shape memory effect of said at least one groove of said metallic, shape memory effect alloy.

2. A process according to claim 1 wherein said alloy comprises Cu, Zn, Al and nickel additions.

3. A process according to claim 1 wherein said alloy comprises Ti, Ni, and Cu.

4. A process according to claim 1 wherein said alloy comprises 2% Ni, 6% Al, 20.5% to 22% Zn and balance Cu.

5. A process according to claim 1 wherein each of said first and second joining elements comprise metallic alloys.

6. A process according to claim 1 wherein said second joining element comprises plastic.

7. A process according to claim 1 wherein said second joining element comprises a ceramic material.

8. A process according to claim 1, wherein said step of forming further comprises forming a circular groove in said first joining element.

9. A process according to claim 1, said first joining element comprising a disc made from a full plate member, wherein said forming further comprises forming at least one circular groove in at least one end face of said plate member.

10. A process according to claim 1, said first joining element comprising a disc made from a thin-walled sheet, wherein said forming further comprises forming a circular groove in at least one end face of said thin-walled sheet.

11. A process according to claim 2 or 6 or 7, wherein said forming at least one groove comprises forming at least one groove such that the radial width of said at least one groove is undersized with respect to said second joining element by at least 2% and by a maximum of 8%.

12. A process according to claim 2 or 7 wherein said first and second joining elements are centro-symmetric and are rectangular in cross section.

13. A process according to claim 2 or 7 wherein said first and second joining elements are centro-symmetric and are hexagonal cross sections.

14. A process according to claim 2 or 7 wherein said first and second joining elements are centro-symmetric and are octangonal in cross section.

15. A process according to claim 2 or 7 wherein said first and second joining elements are centro-symmetric and are circular cross sections.

16. A process according to claim 1 wherein said first joining element comprises a sleeve member and said second joining element comprises a ceramic rod member.

* * * * *